United States Patent Office 2,798,756
Patented July 9, 1957

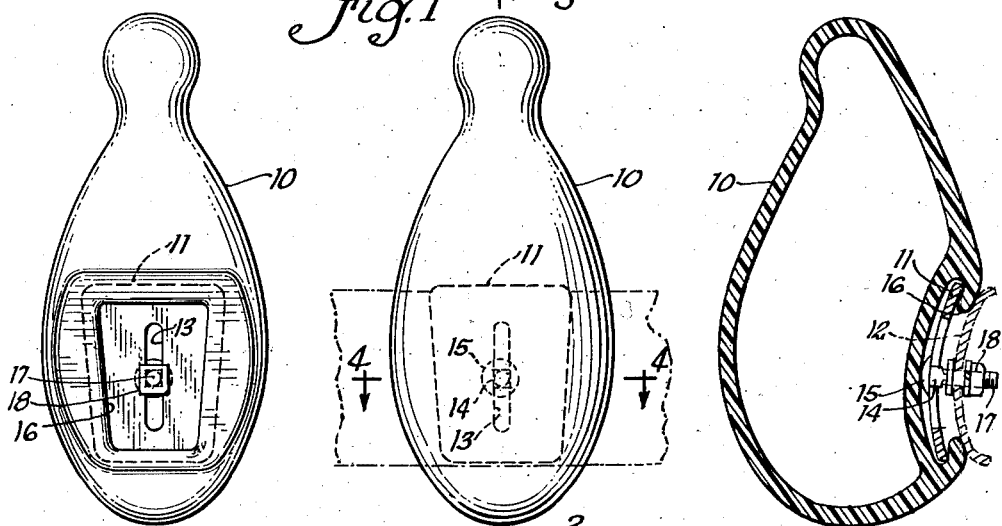

2,798,756

BUMPER GUARDS

Jeff Corydon II, Chicago, Ill.

Application December 8, 1951, Serial No. 260,617

4 Claims. (Cl. 293—67)

This is another improvement in the development of bumper guards made out of rubber, rubber-like, and plastic materials, such as polyvinyl chloride or other plastisols, and with or without plasticizers, since my original application for patent was filed in the United States Patent Office.

The invention disclosed in this application relates to a bumper guard of different shape and structure than in my earlier applications Serial Numbers 170,415 and 191,421, now Patent Numbers 2,731,289 and 2,681,246 respectively, but is strikingly similar in appearance to the bumper guard disclosed in pending application Serial Number 232,425, now Patent No. 2,731,290, although structurally the lower rear wall of the bumper guard of this invention is different. The development and manufacturing of means to fasten my bumper guards to different shapes of bumpers has resulted in several changes in the fastening means and in the structure of the lower rear walls of the bumper guards.

The object of this invention is to provide a bumper guard the casing of which may be constructed out of resilient material and of approximately uniform wall thickness but which has a partial second lower rear wall with an opening therein to permit insertion of special fastening means to attach said bumper guard to any bumper.

This partial second lower rear wall forms a pocket on the outside of the regular lower rear wall of the bumper guard into which pocket a previously shaped fastening means is inserted and a slidably adjustable attaching means extending through a slot in said fastening means is used to secure said bumper guard to any bumper by tightening said fastening means to such bumper by adjusting said attaching means.

The construction of the lower rear wall of the bumper guard of this invention and the specially adapted means for attaching said guard to any bumper greatly increases the application of my bumper guards to almost all vehicles. And although no port is indicated in the rear wall for the passage of air in and out of the guard it is within the scope of this invention to further increase the general application of my bumper guard by using any form of valve means to retain air in the guard at atmospheric or greater pressures such as disclosed in my co-pending applications.

A preferred embodiment of the bumper guard of this invention may comprise a casing of approximately uniform wall thickness but with a partial double lower rear wall which forms a pocket outside the regular lower rear wall of the bumper guard, into which pocket a fastening means with tightening elements attached may be inserted so as the tightening elements extend outward from inside said pocket, said fastening means having been preformed so as to conform to the outside surface of the bumper to which the bumper guard is to be attached, and said tightening elements being suitable to securely attach said preformed fastening means to said bumper and to squeeze said partial double lower rear wall of said bumper guard between said fastening means and said bumper.

The foregoing objects and other attainments are accomplished by the novel construction, combination and arrangement of parts hereinafter described and illustrated in the accompanying drawing wherein a preferred embodiment of this invention is shown.

Figure 1 is a front elevation of the bumper guard of this invention shown mounted on the front of an auto bumper indicated in outline.

Figure 2 is a rear elevation of the bumper guard.

Figure 3 is a vertical sectional view along line 3—3 of Figure 1.

Figure 4 is a horizontal sectional view along line 4—4 of Figure 1.

Figure 5 is a view of a plate for fastening the bumper guard to the auto bumper before the plate has been shaped so as to conform to any particular contour of bumper face.

Figure 6 is a view in perspective of the same plate after being shaped as shown so as to conform to the outside face of a bumper of similar contour.

Figure 7 is a view in perspective of another shape of the fastening plate shown in Figure 5 after bending.

Figure 8 is a view in perspective of another shape of the fastening plate shown in Figure 5 after bending.

In the description of the elements of the aforesaid figures, like numbers refer to the same elements in the several figures and the casing of the bumper guard is identified as 10. The outline of the bumper guard when viewed in front as shown in Figure 1 and when viewed from behind as shown in Figure 2 resembles a bowling pin. However, a side view not shown would correspond in outline to the vertical sectional view shown in Figure 3 and only the front half of that view resembles a bowling pin.

The bumper guard of this invention is fastened to the front face of bumper 12 by plate 11 which is held in place by a carriage bolt extending through slot 13 and through a hole not shown in bumper 12. The carriage bolt is illustrated in Figure 1 by square shank 14 and circular head 15 in dotted outline, as is plate 11 slot 13 and bumper 12.

The rear of the bumper guard casing 10 illustrated in Figure 2 without any bumper bar shows the irregular shaped opening 16 in casing 10 for the insertion of plate 11 inside the back wall of the casing and shown in dotted outline. Means for fastening carriage bolt 17 through the bumper may be a square nut 18. It is within the scope of this invention to use any obvious means for attaching the bumper guard and its fastening plate to the face of the bumper and the invention is not to be limited to the elements shown such as carriage bolt and square nut. However the use of the holding plate 11 with slot 13 for the fastening means is basic to my invention and its importance can be readily understood by examination of Figure 3 which shows the details of securing the bumper guard casing 10 to bumper bar 12.

The vertical sectional view in Figure 3 reveals the double lower rear wall construction of the bumper guard of my invention and how the preformed plate 11 is inserted between the double rear walls and when tightened to the bumper holds the casing firmly on the bumper. When the plate 11 is shaped beforehand so as to conform to the front face of the bumper bar 12 as illustrated and then inserted through opening 16 into the pocket formed by the outside rear wall, the plate and bumper can effect a very close and tight pinch on the lip of the outside rear wall around opening 16 when the fastening means 17 is tightened in place on the bar 12.

A correspondingly clear exposition of the method and means of attaching the bumper guard of this invention to a bumper is also shown in the horizontal sectional view of Figure 4, which because it is along line 4—4 of Figure 1 represents both the plate 11 and the bar 12 as straight. The important feature however is that the plate 11 is shaped beforehand so as to conform to the face of the bumper bar 12. It is the preforming of the plate to correspond with the front surface of the bumper which makes it possible to squeeze the rear wall of the lower rear section of the casing tight between the plate and the bumper to insure a firm attachment of the bumper guard to the bumper.

Figures 6, 7 and 8 illustrate some different shapes in which the flat plate of Figure 5 may be bent so as to conform to the front face of various types of bumpers used on popular passenger autos today. There is no limit to the shapes that may be used but all can be formed from the flat plate of Figure 5 with slot 13. The variation in preformed shapes of plate 11 does not require any change in the construction of my double lower rear walls of casing 10. Neither does the size of the bumper-face involved require any change in the construction of the lower rear walls of the bumper guard because it is only intended to squeeze the lip of the pocket around opening 16 against the bumper-face by the fastening plate 11.

It is within the scope of this invention to construct my bumper guard with a simple hole in the upper rear wall of the casing for the passage of air in and out, or a single check valve, or two holes with a check valve in only one, or any other usual valvular means. Preferably the bumper guard herein described may contain air that became enclosed in the casing during the manufacturing process and the casing have neither an inlet or outlet for passage of air, or the casing may contain air under slight pressures, say up to one or two pounds per square inch, which air may be introduced into the casing by hypodermic means or preferably by inserting a gas forming capsule inside the casing during the manufacturing process.

What I claim as invention:

1. An article of manufacture comprising a rubber-like bumper guard with a preformed plate for holding the guard firmly against a bumper which bumper guard consists of a rubber-like casing containing a quantity of air under slight pressure and shaped similar to a bowling pin except for the lower rear wall which is curved inward where the guard attaches to the bumper, said lower rear wall having a continuous lip protruding outward therefrom which terminates to form an opening conforming with the general shape of said preformed plate but smaller than said plate, said preformed plate having a vertical slot centrally disposed therein, a bolt suitable for insertion through said slot and through an opening in the bumper said guard is to be fastened to, said preformed plate being inserted through the aforesaid opening formed by the continuous lip so that all the edges of said plate are between said lip and the rear wall of the guard, and said bolt being adjusted in said slot so as to hold said guard firmly against the bumper by squeezing said continuous lip against the bumper when tightened thereon with suitable nut and washer.

2. An article of manufacture comprising an air-filled cushioning device with a preformed plate for supporting and holding said device, consisting of a casing made of rubber-like flexible material containing a quantity of air and having a lower rear wall suitable to fit and attach closely to said preformed plate, said lower rear wall having a continuous lip protruding outward therefrom which terminates to form an opening conforming with the general shape of said preformed plate but smaller, said preformed plate having a slot centrally disposed therein, a bolt suitable for insertion through said slot and through an opening in the surface said plate is to be fastened to, said preformed plate being inserted through the aforesaid opening formed by the continuous lip so that all the edges of said plate are between said lip and the rear wall of said casing, and said bolt being adjusted in said slot so as to hold said casing firmly against the surface said plate is to be fastened to by squeezing said continuous lip against said surface when tightened thereon with suitable nut and washer.

3. A cushioning device comprising a hollow casing of rubber-like flexible material having a special rear wall for attachment to an object, said rear wall having a partial wall exterior to it but separated from it by an air space, said partial exterior wall being attached to said rear wall around the entire edge of said rear wall thereby forming a pocket, said partial and exterior rear wall having a central opening therein, a rigid member suitable for insertion through said central opening, said rigid member when adjusted in said pocket substantially filling same and completely covering said central opening, and means connected to said rigid member and extending rearwardly through said central opening for drawing said rigid member and said partial exterior wall toward said object.

4. A bump absorbing device comprising an air-filled casing of rubber-like plastic material having a special rear wall for attachment to any selected surface and preformed means for attaching said casing to said surface, said rear wall having a partial wall exterior to it but joined to it all around its edge whereby to form a pocket, said partial exterior wall having a central annular opening therein, a preformed rigid member, which had previously been shaped to coincide with said selected surface, suitable for insertion through said annular opening in said exterior wall, said preformed rigid member being fittingly adjustable within said pocket so as to completely cover said central annular opening, said preformed member having a centrally disposed slot therein, and separately adjustable fastening means suitable for insertion through said slot in said preformed member and to extend rearwardly through said annular opening in said partial exterior wall so as to draw said preformed member and said partial exterior wall against said selected surface.

References Cited in the file of this patent

UNITED STATES PATENTS

| | | |
|---|---|---|
| 1,709,494 | Shoemaker | Apr. 16, 1929 |
| 1,744,408 | Millard | Jan. 21, 1930 |
| 1,834,824 | Brown | Dec. 1, 1931 |
| 1,978,179 | Weiland | Oct. 23, 1934 |
| 2,243,462 | Fageol | May 27, 1941 |

FOREIGN PATENTS

| | | |
|---|---|---|
| 315,986 | Great Britain | July 25, 1929 |